United States Patent [19]

Picardat

[11] 3,995,569
[45] Dec. 7, 1976

[54] TWO PART LAWN TREATING MACHINE

[76] Inventor: Robert N. Picardat, 7712 Ridgecrest Drive, Alexandria, Va. 22308

[22] Filed: Mar. 28, 1975

[21] Appl. No.: 563,057

[52] U.S. Cl. .................................... 111/12; 111/6; 239/656; 180/51; 180/11; 172/464; 172/548; 172/709
[51] Int. Cl.² ........................................ A01C 7/08
[58] Field of Search ................. 180/11, 49, 51, 52; 239/656, 661–662, 670, 687; 111/1, 6, 8–13

[56] References Cited
UNITED STATES PATENTS

| | | | |
|---|---|---|---|
| 2,687,307 | 8/1954 | Austermiller | 239/687 |
| 3,247,812 | 4/1966 | Luciano et al. | 111/1 |
| 3,299,982 | 1/1967 | Bacon | 180/52 |
| 3,334,702 | 8/1967 | Granryd | 180/51 |
| 3,352,261 | 11/1967 | Bonnell | 111/8 |
| 3,446,165 | 5/1969 | Magda et al. | 111/11 |
| 3,544,013 | 12/1970 | Dorfman | 239/656 |
| 3,583,510 | 6/1971 | Hastings | 180/11 |
| 3,777,991 | 12/1973 | Picardat | 239/656 |
| 3,822,655 | 7/1974 | Benedict et al. | 111/1 |
| 3,826,209 | 7/1974 | Jackson | 111/8 |

Primary Examiner—Robert E. Bagwill
Attorney, Agent, or Firm—Berman, Aisenberg & Platt

[57] ABSTRACT

A lawn treating machine consisting of a wheeled front section and a wheeled rear section hinged together by a hydraulically operated vertical hinge mechanism for steering the machine. The front section includes a hydraulically driven scattering mechanism provided at the lower outlets of a multiple-compartment hopper assembly. The scattering mechanism includes a rotating horizontal scattering disc and rotating agitating and feeding elements which feed material from the hopper compartments to the disc. The rear section carries an engine-driven hydraulic pump supplying pressure hydraulic fluid to respective hydraulic motors driving the wheels of the front section. The rear section also carries a pivotally mounted transversely extending ground-scarifying blade assembly having a plurality of sod-piercing blades, the assembly being raised and lowered by hydraulic link means. The front section carries a tank for liquid chemicals, connected to a spray nozzle assembly at the rear portion of the front section, and the spray tank is provided with a hydraulically driven liquid pressurizing pump.

38 Claims, 17 Drawing Figures

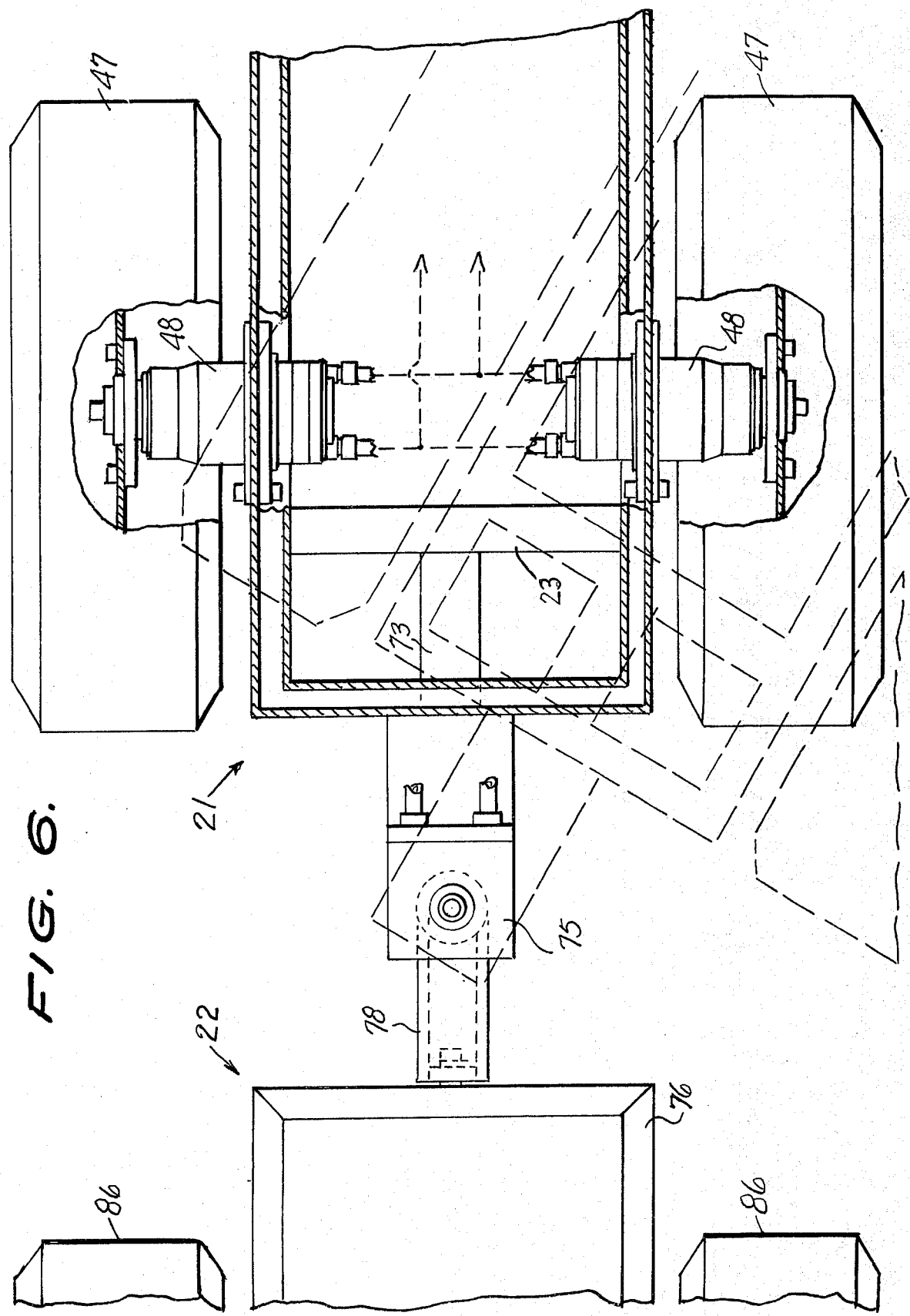

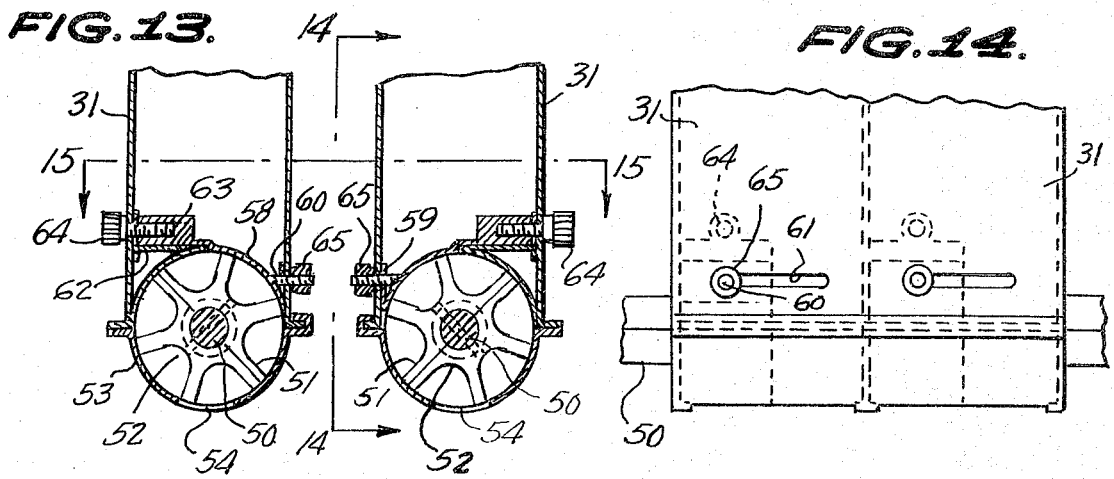
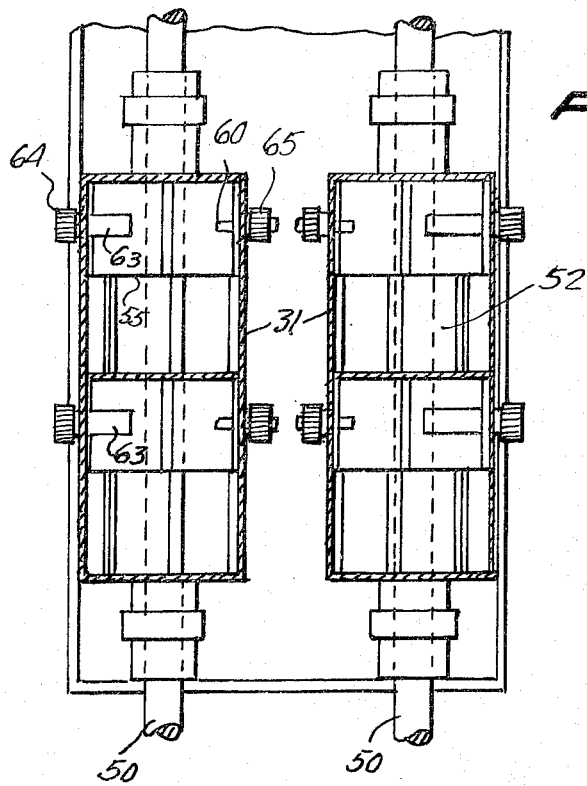
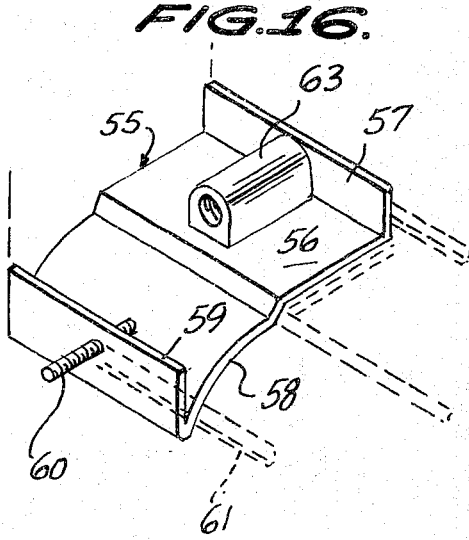

TWO PART LAWN TREATING MACHINE

This invention relates to lawn treating machines, and more particularly to a lawn treating machine of the self-propelled type adapted to distribute treatment materials, either liquid or dry, or both, on a lawn.

A main object of the invention is to provide a novel and improved lawn treatment machine which is of relatively simple construction, which is highly maneuverable, and which provides effective and economical distribution of lawn treating material, such as grass seed, fertilizers, or the like.

A further object of the invention is to provide an improved machine to support and drive a hopper-fed scattering mechanism for scattering lawn treating materials, including grass seed and fertilizers, on a lawn as the machine moves thereacross, the machine being completely self-contained, being easy to control, and providing a high degree of visibility for the operator of the machine as he guides it over a lawn area being treated.

A further object of the invention is to provide an improved self-powered lawn treating machine adapted to scatter various treating materials, either of the liquid or dry type, on a lawn, the machine having high maneuverability, being arranged so that the material being scattered by the machine is not blocked by the supporting wheels thereof, providing even distribution of the materials being spread over the lawn, having a relatively small turning radius so that it can be easily steered, even in relatively restricted areas, and being arranged so that the operator has instant visibility for observing the hoppers of the machine and the action of the scattering mechanism of the machine as it moves across a lawn.

A still further object of the invention is to provide an improved articulated lawn treating machine having a rear portion carrying the power generating means of the machine and having a front portion carrying the hoppers and associated distributing mechanism, the front and rear sections being vertically hinged together and the machine being steered by controlling the hinge action of the front and rear sections, whereby to provide an efficient means for steering and guiding the machine, the wheels of the machine being located so that they do not in any way interfere with the distribution of the materials being spread by the machine, and the machine having high capacity for materials to be distributed as well as a high degree of maneuverability and visibility of its action by the operator as it moves across a lawn undergoing treatment.

A still further object of the invention is to provide an improved machine to support and drive a hopper-fed scattering mechanism for scattering lawn treating materials such as grass seed, fertilizers, or the like on the lawn as the machine moves thereacross, the machine being further provided with sod-cutting blades which can be lowered into operating working contact with the lawn for aerating the lawn and providing a sod-penetrating action which is of high value in the lawn treatment procedure.

Further objects and advantages of the invention will become apparent from the following description and claims, and from the accompanying drawings, wherein:

FIG. 6 is a fragmentary enlarged horizontal cross-sectional view taken substantially on line 6—6 of FIG. 2.

FIG. 13 is an enlarged fragmentary transverse vertical cross-sectional view taken substantially on line 13—13 of FIG. 3.

FIG. 14 is a vertical cross-sectional view taken substantially on line 14—14 of FIG. 13.

FIG. 15 is a horizontal cross-sectional view taken substantially on line 15—15 of FIG. 13.

FIG. 16 is an enlarged perspective view of an adjustable flow-controlling slide plate associated with one of the hopper compartments employed in the machine.

Figure 1:
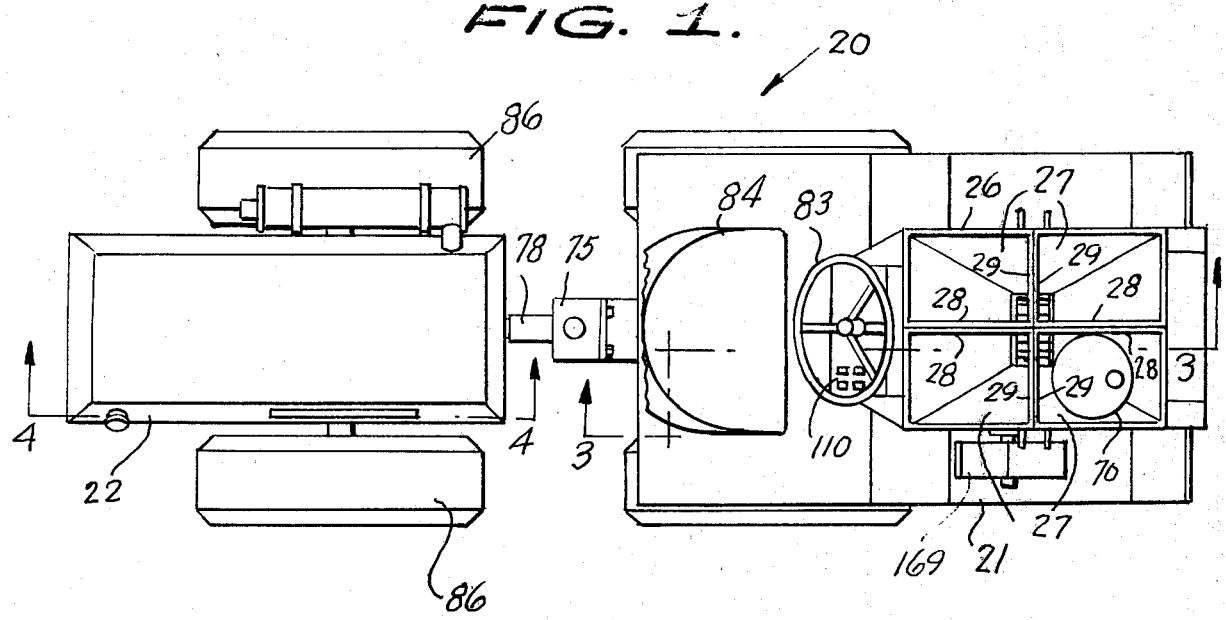
FIG. 1 is a top plan view of an improved lawn treating machine construction in accordance with the present invention, with a portion of the driver's seat broken away to better reveal the structure therebelow.

Referring to the drawings, 20 generally designates an improved lawn treating machine constructed in accordance with the present invention. The machine 20 comprises a wheeled front section 21 and a wheeled rear section 22 which are hingedly connected together by a hydraulically controlled hinged mechanism shown in detail in FIG. 4 and presently to be described.

The front section 21 (see FIGS. 3 and 5) comprises a generally rectangular horizontally extending frame 23 on which is secured a longitudinally extending housing 24 having an upstanding front portion 24 in which is secured a multiple-compartment hopper assembly 26 comprising four joined compartments 27 which are generally rectangular in plan, having inner longitudinal walls 28 and inner transverse walls 29 which are secured together in the manner shown in FIG. 1 to define the composite hopper assembly 26. The compartments have downwardly and inwardly inclined bottom walls (see FIG. 5) which lead toward respective short vertical bottom outlet ducts 31 provided for the respective hopper compartments.

Figure 3:
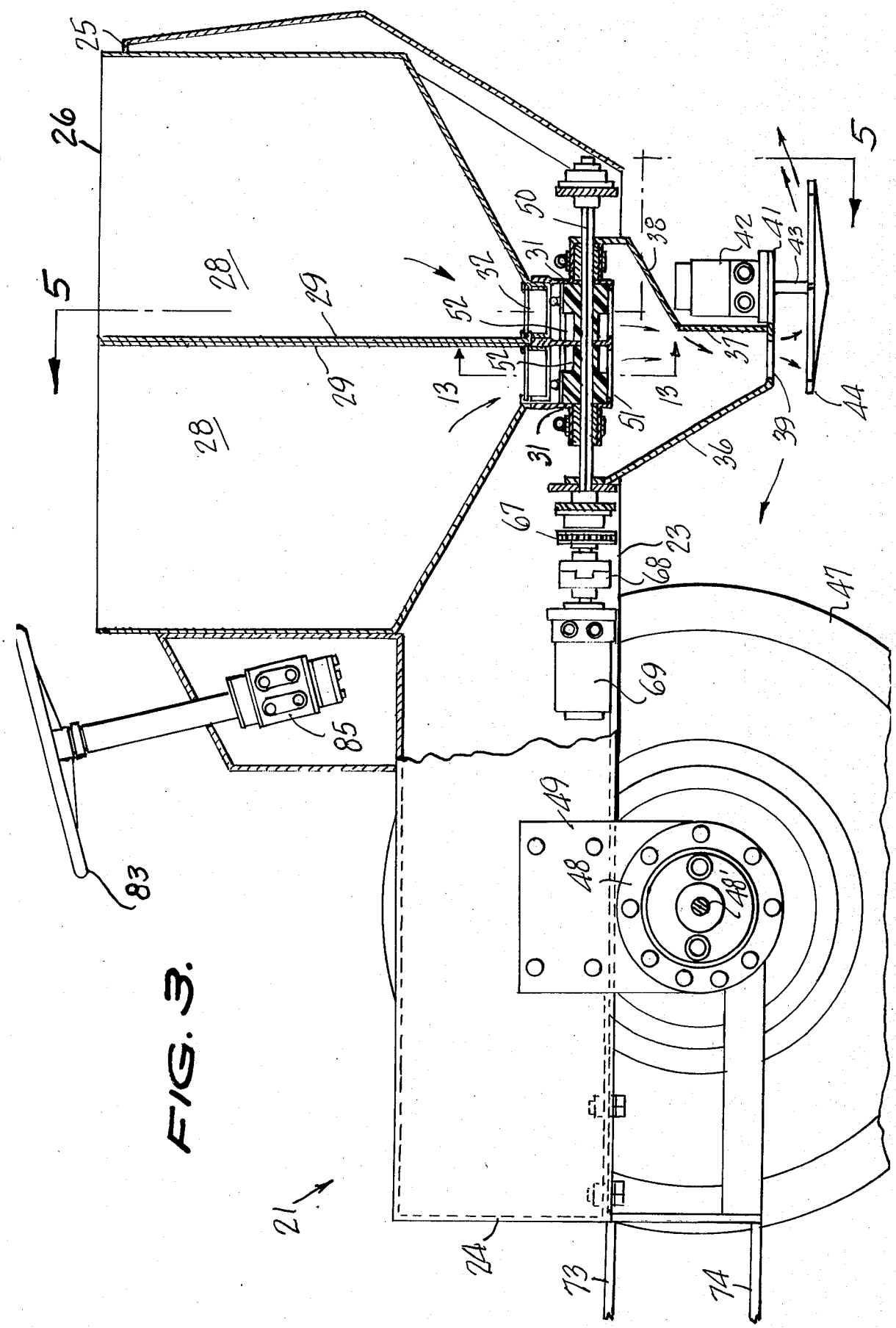
FIG. 3 is an enlarged longitudinal vertical cross-sectional view through the front section of the machine of FIGS. 1 and 2, said view being taken substantially on the line 3—3 of FIG. 1.
Figure 5:
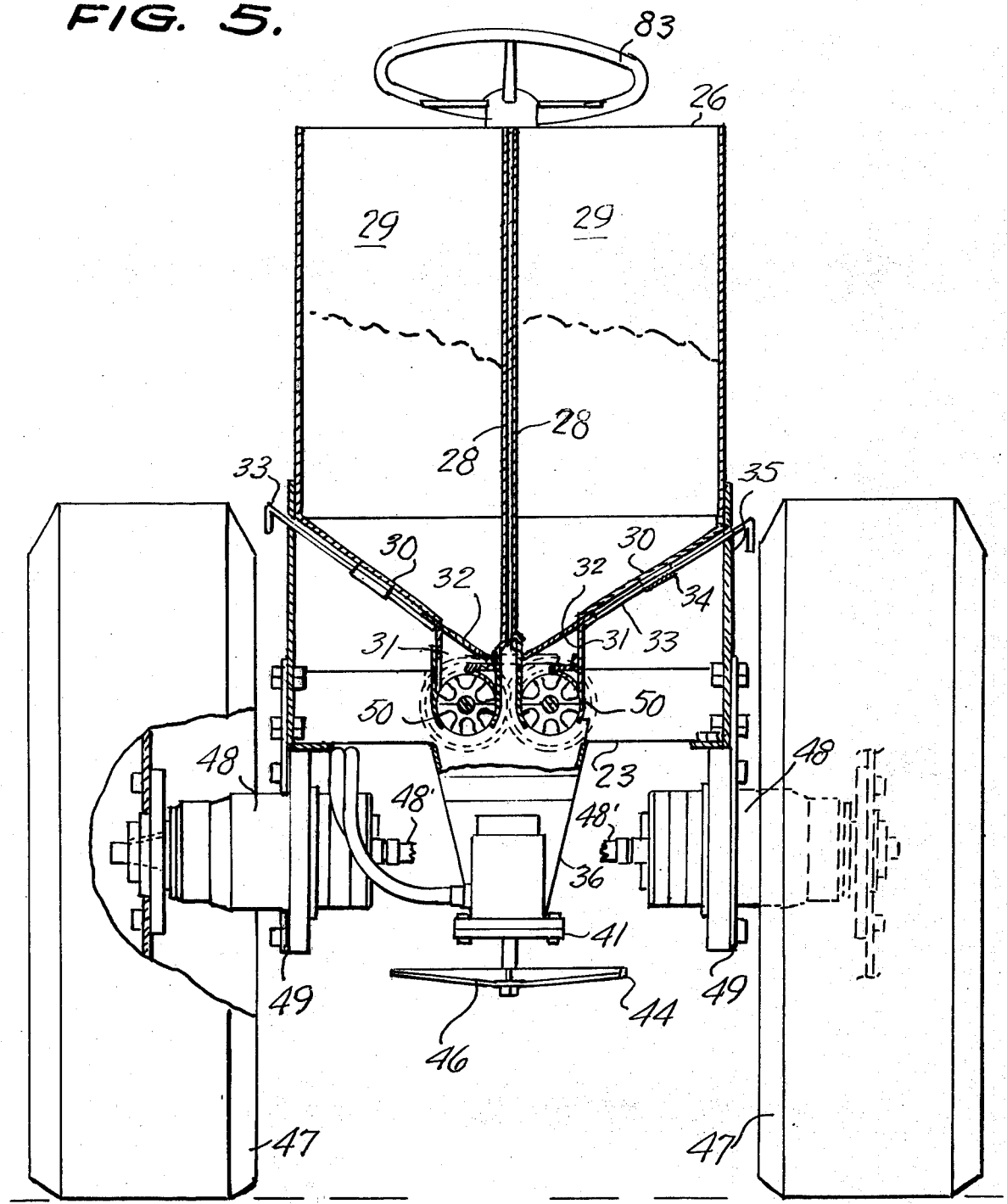
FIG. 5 is a transverse vertical cross-sectional view taken sustantially on line 5—5 of FIG. 3.
Figure 17:
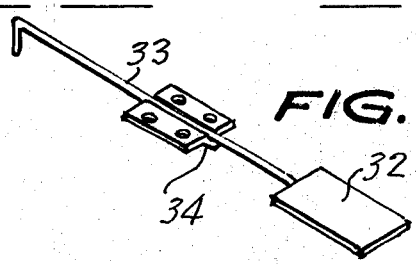
FIG. 17 is a perspective view of a hopper gate member and associated supporting bracket, employed in the lawn treating machine of FIG. 1.
Figure 7:
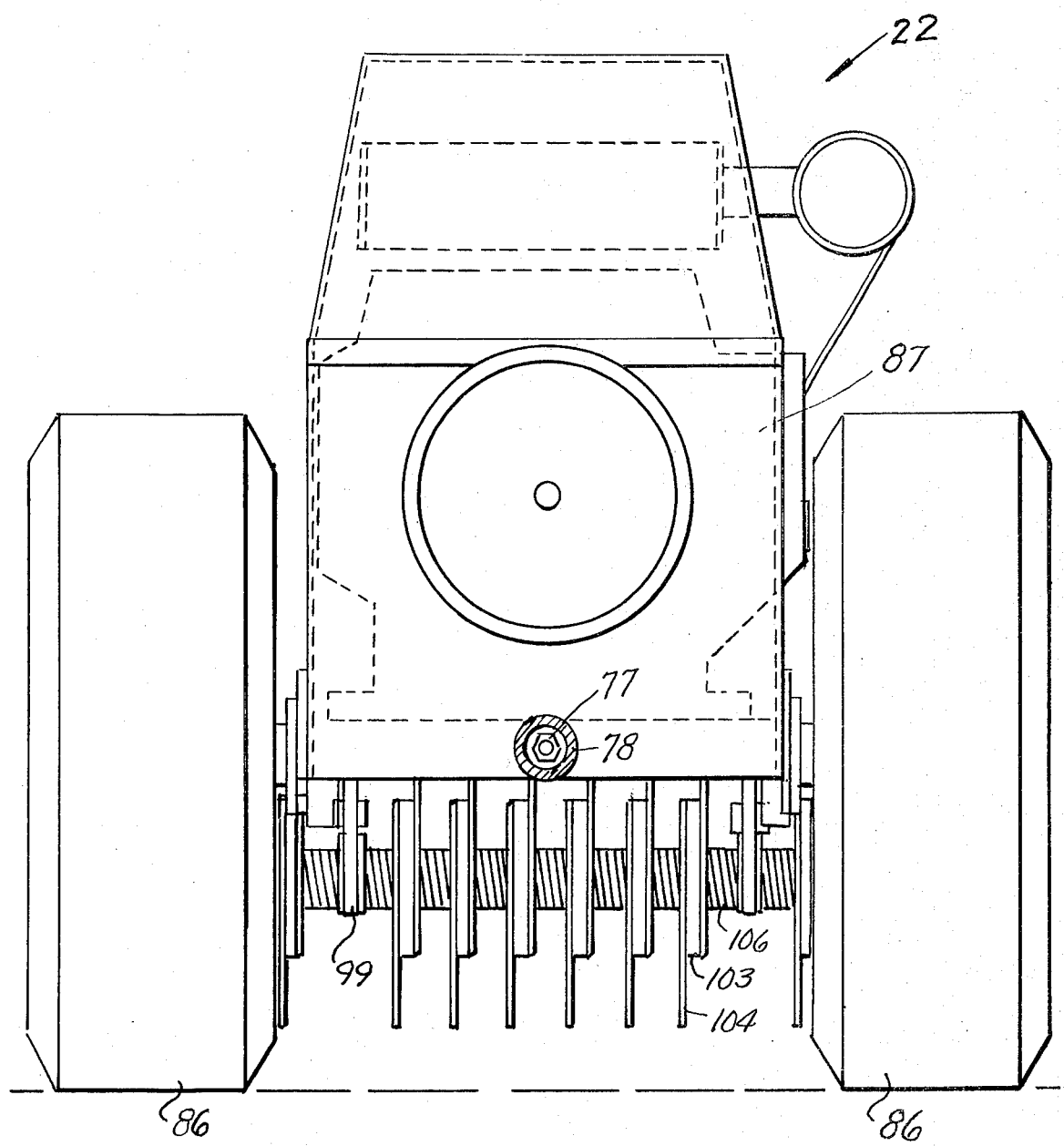
FIG. 7 is an enlarged transverse vertical cross-sectional view taken substantially on line 7—7 of FIG. 2.

As shown in FIGS. 3 and 5, each outlet duct 31 is provided with a slidable plate-like gate member 32 to the external portion of which is connected a control rod 33 extending through a guide channel bracket 34 secured to the adjacent inclined bottom wall portion 30 of the associated compartment 29. The control rods 33 have externally projecting outer ends which may be employed by the operator to adjust the positions of the gate members 32 to provide a desired rate of flow of the material in the associated hopper compartment, or to cut off the flow thereof if so desired.

In a typical arrangement illustrated in the drawings there are two pairs of longitudinally aligned bottom outlets 31. Below the outlets 31, the housing 24 is formed with a depending discharge spout 36 whose front wall is offset in the manner shown at 37 to provide an inclined intermediate portion 38 to guide material downwardly toward the bottom outlet 39 of the discharge spout. A forwardly extending horizontal plate 41 is secured to the bottom end of the discharge spout 36 and vertically mounted thereon is a hydraulic motor 42 which may be of the "Lamina" type, and secured to the depending shaft 43 of motor 42 is a horizontally arranged material-distributing disc member 44. The disc member 44 may be in the shape of a shallow upwardly facing cone and may be provided with radiating rib elements 46 to assist in the outward dispersion of material dropping on the disc member from the discharge opening 39. As shown in FIG. 3, the opening 39 is located over the rear portion of the rotary distributing disc member 44, and material dropping from the opening 39 onto the disc member is rotated and discharged from the disc member by centrifugal action, being dispersed outwardly and upwardly at a small angle to the horizontal.

The frame portion of front section 21 is supported at its opposite sides by respective wheels 47, 47 which are driven by hydraulic wheel motors 48, 48 secured to depending supporting plate members 49, 49 secured to opposite sides of the frame 23, as shown in FIG. 5. The hydraulic wheel motors 48 may be of the "Char-Lynn" type. The motors 48 are mounted on a common transverse horizontal axis 48', and the wheels 47 are secured on the shafts of the motors and therefore rotate around said common transverse axis 48'. As shown in FIG. 3, said transverse horizontal wheel axis is located at the rear portion of front section 24 and a substantial distance rearwardly from the material-distributing disc 44.

Longitudinally journalled in frame 23 and extending through the lower portions of the outlet ducts 31 are respective shafts 50, 50, each being arranged as to extend through the lower portions of the pair of longitudinally aligned ducts 31, 31, as shown in FIG. 3. Rigidly secured on the shafts are agitating rollers 51 having solid outer portions and longitudinally grooved inner peripheral portions 52. The agitating rollers 51 are contained in generallly cylindrical housing portions 53 secured to the bottom ends of the ducts 31, said cylindrical housing portions having bottom openings 54, as shown in FIG. 13. Slidably mounted above each roller 51 is a valve plate member 55 (see FIG. 16), each valve plate member having a horizontal main body portion 56 terminating at one end in an upstanding flange 57 and merging with an arcuately curved flange portion 58 at its opposite end, the portion 58 being conformably curved to form a continuation of the associated housing 53, as shown in FIG. 13. The arcuate portion 58 merges with an upstanding vertical end flange 59 to the central portion of which is rigidly secured a stud 60 which extends slidably through a horizontal slot 61 provided in the adjacent wall of the associated duct 31. The main body portion 56 is slidably supported on a horizontal plate element 62 connected between the opposite side wall of duct 31 and the associated housing 53, as shown in FIG. 13, and a lug 63 is provided on the associated horizontal plate element 56. A thumb screw 64 is engaged through a horizontal slot provided in the wall of the duct 31 and is threadedly engaged with the lug 63. A nut 65 is provided on the stud 60, so that the slide plate 55 may be locked in adjusted position overlying the associated distributing roller 51 by tightening the nut 65 and the thumb screw 64. The horizontal slots provided in the ducts 31 are of sufficient length so that the slide plates 55 may be moved horizontally to adjusted positions from positions overlying the solid portions of the rollers 51 to positions overlying the longitudinally grooved portions of said rollers, to thereby regulate the flow of material around the rollers and to similarly provide an adjusted material-feeding action. FIG. 15 illustrates the slide plates 55 in their fully opened positions providing maximum contact of the material from the four hopper compartments with the rotating grooved portions 52 of agitating rollers 51.

The side-by-side shafts 50, 50 are coupled together by conventional coupling means such as sprocket wheels and sprocket chain means, shown at 67 in FIG. 3, so that the shafts 50 are rotated in opposite directions. One of the shafts is drivingly coupled by a conventional coupling assembly 68 to a hydraulic motor 69, which may be a hydraulic motor of the "Char-Lynn" type.

It will be seen from FIG. 13 that the coupling of the shafts 50, 50 is such that the left shaft rotates clockwise while the right shaft rotates counterclockwise, as viewed in FIG. 13, causing the material to descend through the ducts 31, 31 to be carried by the groove portions 52 downwardly and inwardly and to be ultimately delivered to the lower spout portion 36 for discharge through the opening 39 onto the rotating spreading disc 44.

Mounted in one of the compartments 27 is a tank 70 for liquid chemicals to be distributed during the operation of the machine. Suitably secured to the frame of the front section 21 at its rear portion, is a downwardly and rearwardly directed nozzle assembly 71 to which liquid from the tank 70 is delivered under pressure. The tank 70 is provided with a hydraulically driven liquid pressurizing pump, presently to be described, and the hydraulic motor driving said pump is provided with suitably controlled valve means for thereby controlling the action of the liquid spray system.

As shown in FIGS. 1, 2, 4 and 6, the front section 21 is hingedly connected to the rear section 22 for universal relative pivoting action. Thus, the front section frame is provided with a pair of rearwardly extending parallel horizontal plate members 73, 74. Secured on the top plate member 73 is the hydraulic steering motor 75, which may be of the "Rotac" type. The frame 76 of the rear section 22 is provided at its forward end with a rearwardly extending headed pivot bolt 77 which is rotatably connected to a longitudinally extending pivot sleeve 78 rigidly secured to a vertical sleeve 79 in which is internally secured a vertical shaft extension member 80 keyed to the depending output shaft 81 of the motor 75. Thus, the shaft extension 80 extends through the horizontally spaced plate members 73, 74 with the sleeve member 79 vertically received between said plate members and surrounding the shaft extension member 80. The shaft extension member 80 and the sleeve 79 are rotatably supported in the plates 73, 74 so as to permit rotation of the horizontally extending sleeve member 78 around the vertical axis of the shaft extension member 80. The sleeve member 78 is also rotatable around the horizontal axis of the longitudinal pivot bolt 77 carried by rear section 22. Sleeve member 79 is keyed to shaft extension member 80 in any suitable manner, for example, by locking key elements 82, 82 shown in FIG. 4. Thus, torque generated by the hydraulic motor 75 is transmitted to the sleeve member 79 and thus to the horizontal sleeve member 78 to thereby correspondingly cause the front and rear sections 21 and 22 to rotate relative to each other to provide the desired steering effect.

Figure 2:
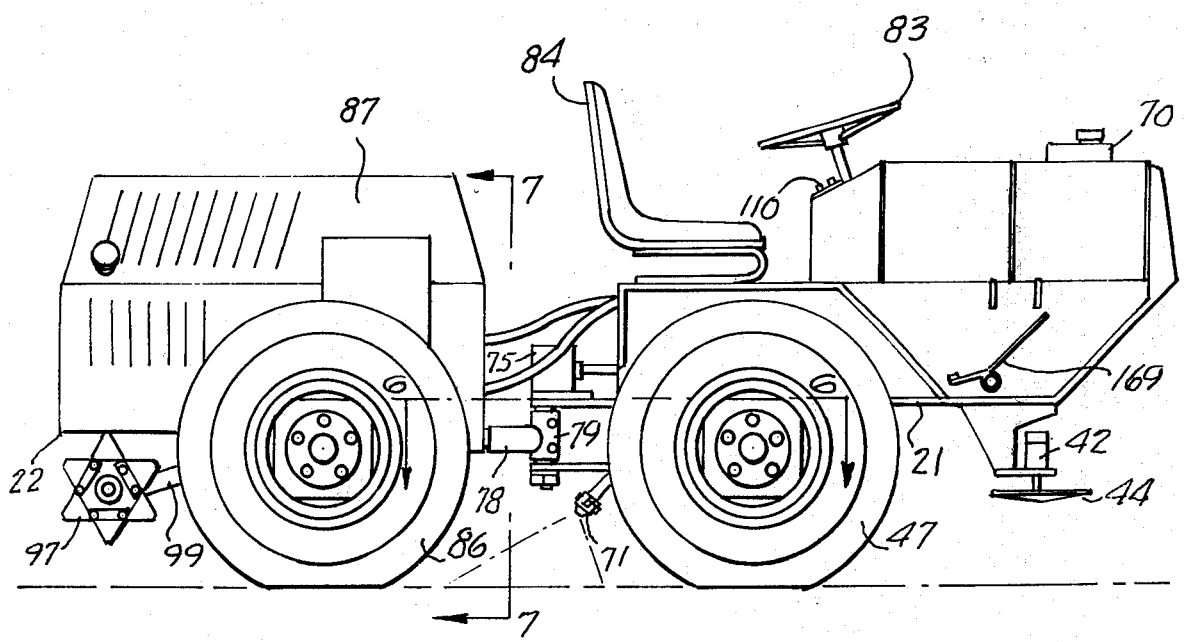
FIG. 2 is a side elevational view of the lawn treating machine of FIG. 1.

A steering wheel 83 is located ahead of the operator seat 84 which is mounted on the rear portion of front section 21, as shown in FIGS. 1 and 2. The steering wheel 83 controls the action of a conventional reversing valve 85 (see FIG. 12) which may be of the "Orbitrol" type and which in turn controls the action of the hydraulic steering motor 75.

Figure 4:
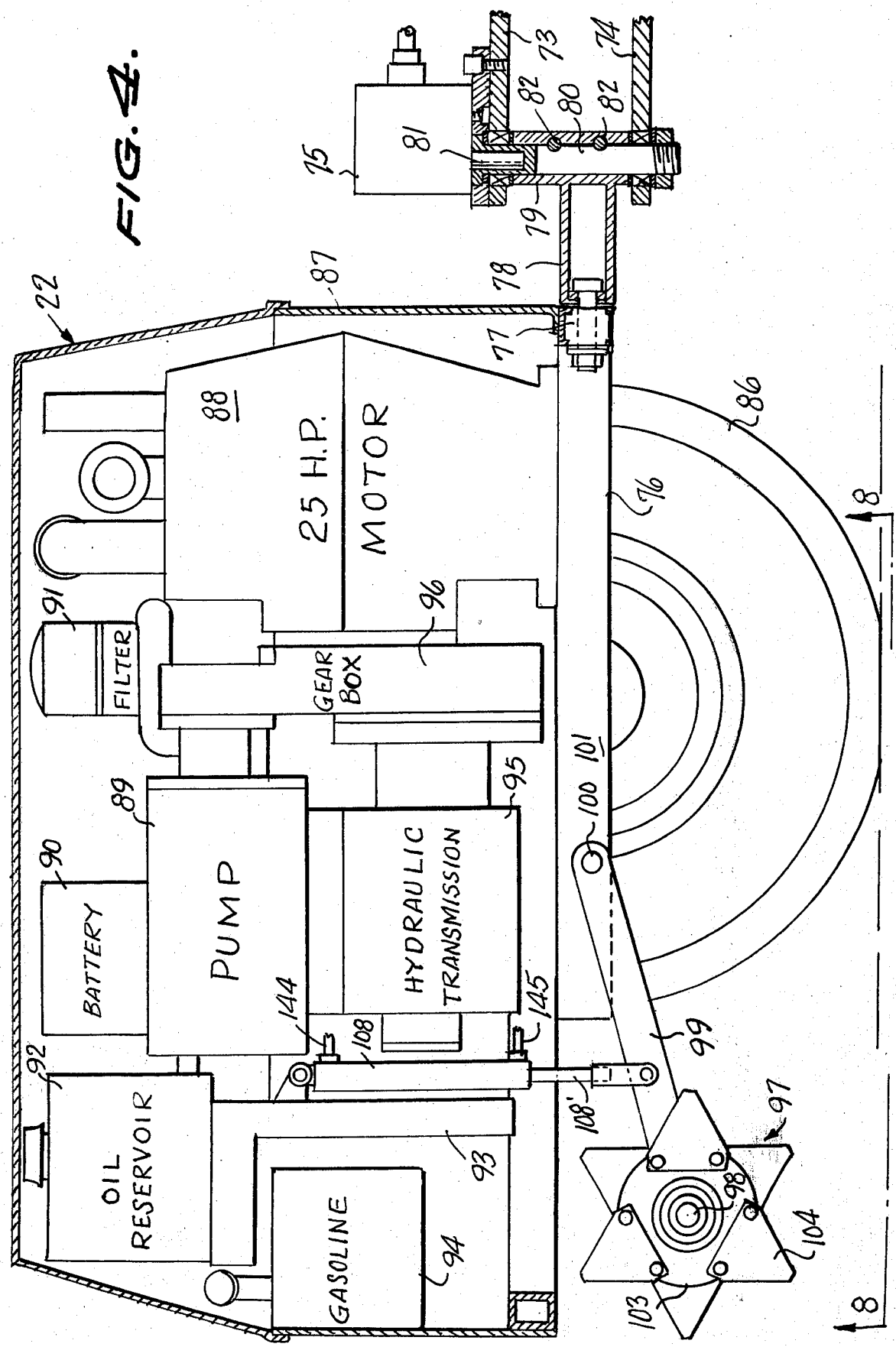
FIG. 4 is a longitudinal vertical cross-sectional view taken through the rear section of the machine of FIGS. 1 and 2, said view being taken substantially on the line 4—4 of FIG. 1.

As best shown in FIG. 4, the rear section 22 of the machine comprises the frame 76 which is supported on a pair of wheels 86, 86 suitably journalled to said frame. Mounted on the frame 76 is a housing 87 containing the power-generating elements of the machine. Thus, mounted on frame 76 within housing 87 is an internal combustion engine 88 of suitable capacity, for example, about 25 horsepower which is drivingly coupled to the main hydraulic pump 89 mounted on the frame adjacent to the motor 88. A battery 90 is provided for energizing the various electrical components of the machine, presently to be described, including the ignition system of the motor 88. An oil filter 91 is provided between the pump 89 and a hydraulic reservoir 92 mounted in the upper rear portion of housing 87. The reservoir 92 is supported on an upstanding bracket 93, and mounted in the rear portion of housing 87 rearwardly adjacent bracket 93 is a conventional gasoline tank 94. The motor 88 is connected to the pump 89 and a suitable transmission system including a conventional gearing assembly 96 and a conventional hydraulic transmission assembly 95, shown in FIG. 4.

Figure 8:
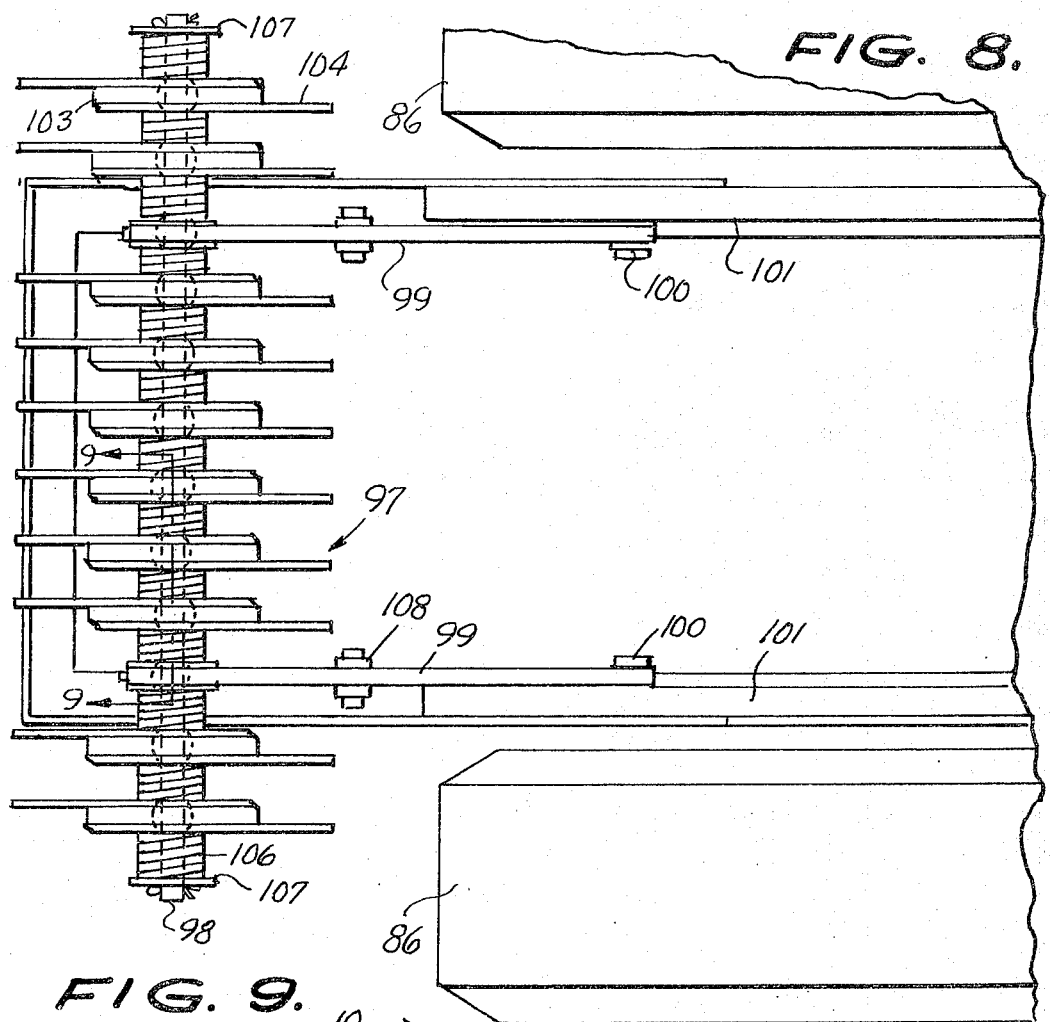
FIG. 8 is a fragmentary horizontal bottom plan view taken substantially on line 8—8 of FIG. 4, showing the sod-piercing blade assembly of the machine of FIGS. 1 and 2.
Figure 9:
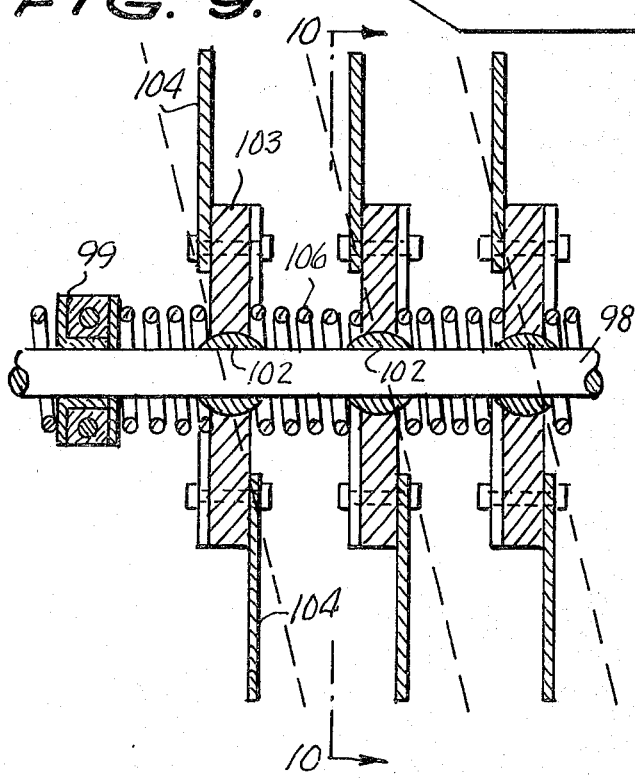
FIG. 9 is a fragmentary enlarged vertical cross-sectional view taken substantially on line 9—9 of FIG. 8.
Figure 10:
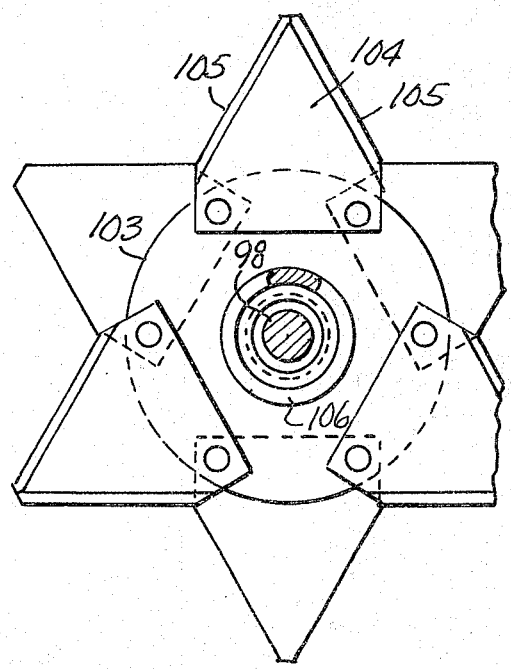
FIG. 10 is a vertical cross-sectional view taken substantially on line 10—10 of FIG. 9.

Referring to FIGS. 4, 7, 8, 9 and 10, it will be seen that the rear section 22 is provided at its rear portion with a ground scarifying assembly, designated, generally at 97, which may be employed to aerate and penetrate the sod as the rear portion of the machine moves over its course of travel. The assembly 97 comprises a transversely extending main supporting shaft 98 which is carried by a pair of swingable arms 99, 99 pivoted at 100, 100 to respective longitudinal side bars 101, 101 forming part of the frame 76 of rear section 22. As shown in FIG. 8, the pivotal connections 100, 100 are on a common transverse axis. Secured on the supporting bar 98 are uniformly spaced substantially spherical annular bearing elements 102 (FIG. 9) on which are swivelly mounted independent disc members 103. Secured to opposite sides of the disc members 103 in alternating sequence are outwardly projecting triangular blades 104 having sharpened edges 105, 105 converging to points, as shown in FIG. 10. Thus, in the typical embodiment illustrated, there are six triangular blades alternating on opposite sides of the associated body member 103, to thereby define a substantially star-shaped assemblage having six triangular points projecting therefrom. The respective disc members 103 are held apart resiliently by the provision of coil springs 106 surrounding the supporting rod 98 and bearing between the successive disc members 103 and also bearing between the supporting arms 99 and the adjacent disc members, as shown in FIG. 9. Abutment washers 107 are provided at the ends of the rod 98, as shown in FIG. 8, and springs 106 are provided between the abutment washers 107 and the inwardly adjacent disc members 103. It will thus be seen that the star-shaped multi-bladed assemblies above described can be rotatably tilted from their vertical positions, for example, to the dotted positions thereof shown in FIG. 9, but are biased by the springs 106 in a manner to urge them to return to said vertical positions. Since the bodies 103 are independently swivelly mounted on their associated spherical-shaped bearing elements 102, they are independently rotatable about the shaft 98 and tiltable with respect to each other and need not retain their parallelism or alignment.

Respective hydraulic cylinders 108 depend from and are pivotally connected to the upstanding bracket 93, and the piston rods 108' of said cylinders are respectively pivotally connected to the intermediate portions of the scarifier supporting arms 99, thereby defining extensible and contractable hydraulic link means connecting the arms 99 to the frame of the rear section 22. This permits the scarifying assembly 97 to be raised and lowered as required by simultaneously operating the respective hydraulic cylinders 108. For this purpose, pressure fluid and fluid-returning conduits 144, 145 (FIGS. 4 and 12) are connected to the scarifier raising and lowering cylinders 108 through a conventional solenoid reversing valve assembly 109 which can be energized from the battery 90 through suitable circuit means including control switch means provided on an instrument panel 110 (FIG. 1) located forwardly adjacent the operator's seat 84.

Figure 11:
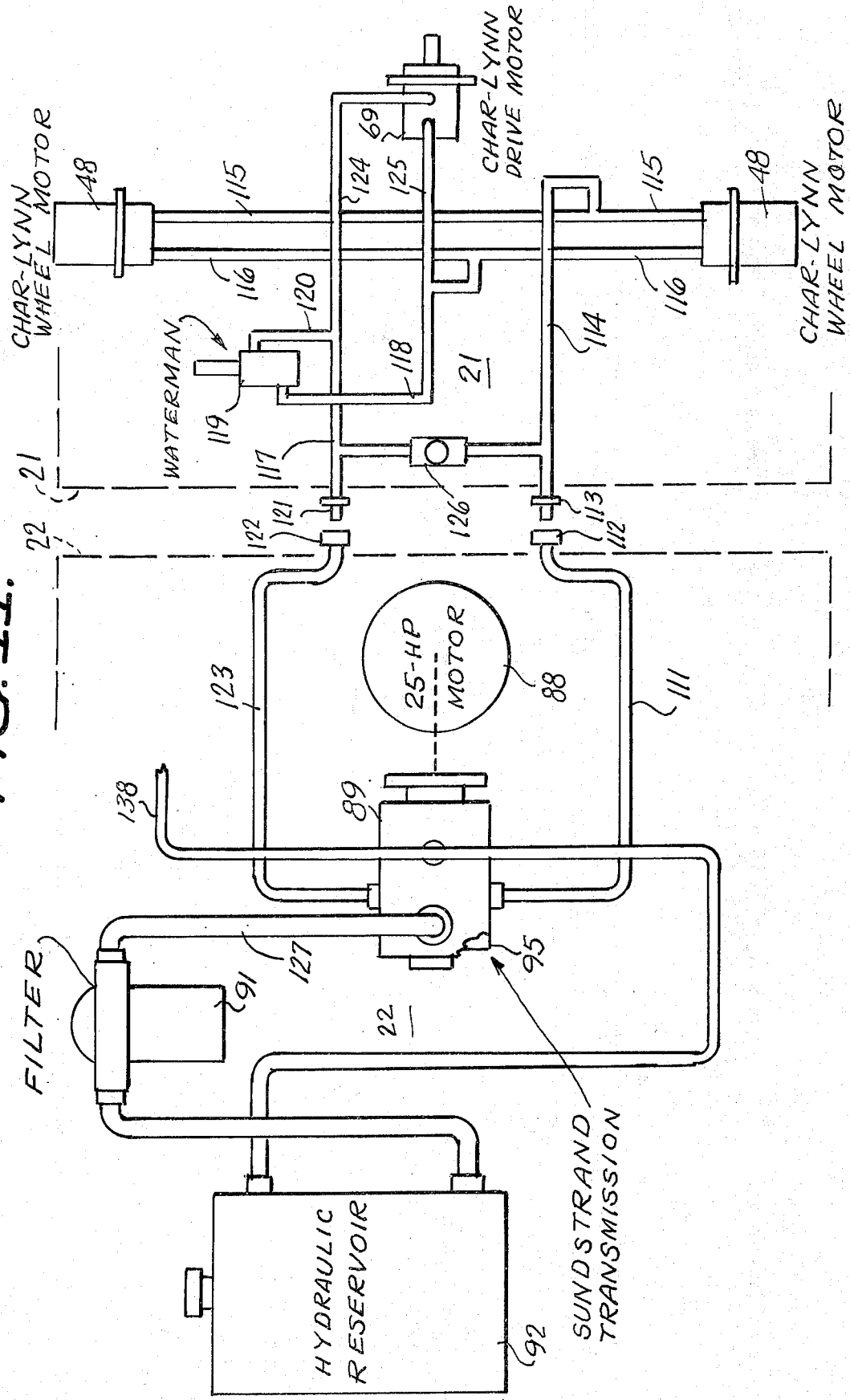
FIG. 11 is a schematic diagram showing the hydraulic circuit associated with the wheel motors and hopper feed motor of the typical lawn treatment machine shown in FIGS. 1 and 2.

Referring now to FIG. 11, it will be seen that the output side of the hydraulic pump 89 is connected by a flexible conduit 111, interengagable conduit fittings 112 and 113 and a conduit 114 on the forward section 21 to hydraulic fluid intake conduits 115, 115 connected to the intake ports of the wheel motors 48, 48. The fluid outlet conduits 116, 116 of motors 48 are connected to a return conduit 117 through conduit 118, solenoid valve 119 and conduit 120. The return conduit 117 is connected through interengaging male and female conduit coupling elements 121 and 122 to a main flexible return conduit 123 on the rear section 22 connected to pump 89. The agitator motor 69 (FIGS. 3 and 11) is connected across the agitator-controlling solenoid valve 119 by conduits 124, 125. The agitator motor 69 is driven by the pressure drop across conduits 124 and 125, and this is controlled by the opening and closing of the solenoid valve 119. The operating switch for controlling valve 119 is located on the instrument panel 110.

A pressure by-pass valve 126 is connected across the pressure fluid conduit 114 and the return conduit 117, as shown in FIG. 11.

The main hydraulic system above-described may employ a hydraulic system such as the Sundstrand split system including a variable pump 89 which is driven by the engine 88 and produces 5000 P.S.I. at 3900 R.P.M. For purposes of the present invention, a speed of 2200 R.P.M., or half throttle condition, is sufficient for the proper operation.

The filter assembly 91, which may incorporate a 10 micron filter element, is connected in the section of the conduit 127 between the hydraulic reservoir 92 and the intake port of pump 95.

Figure 12:
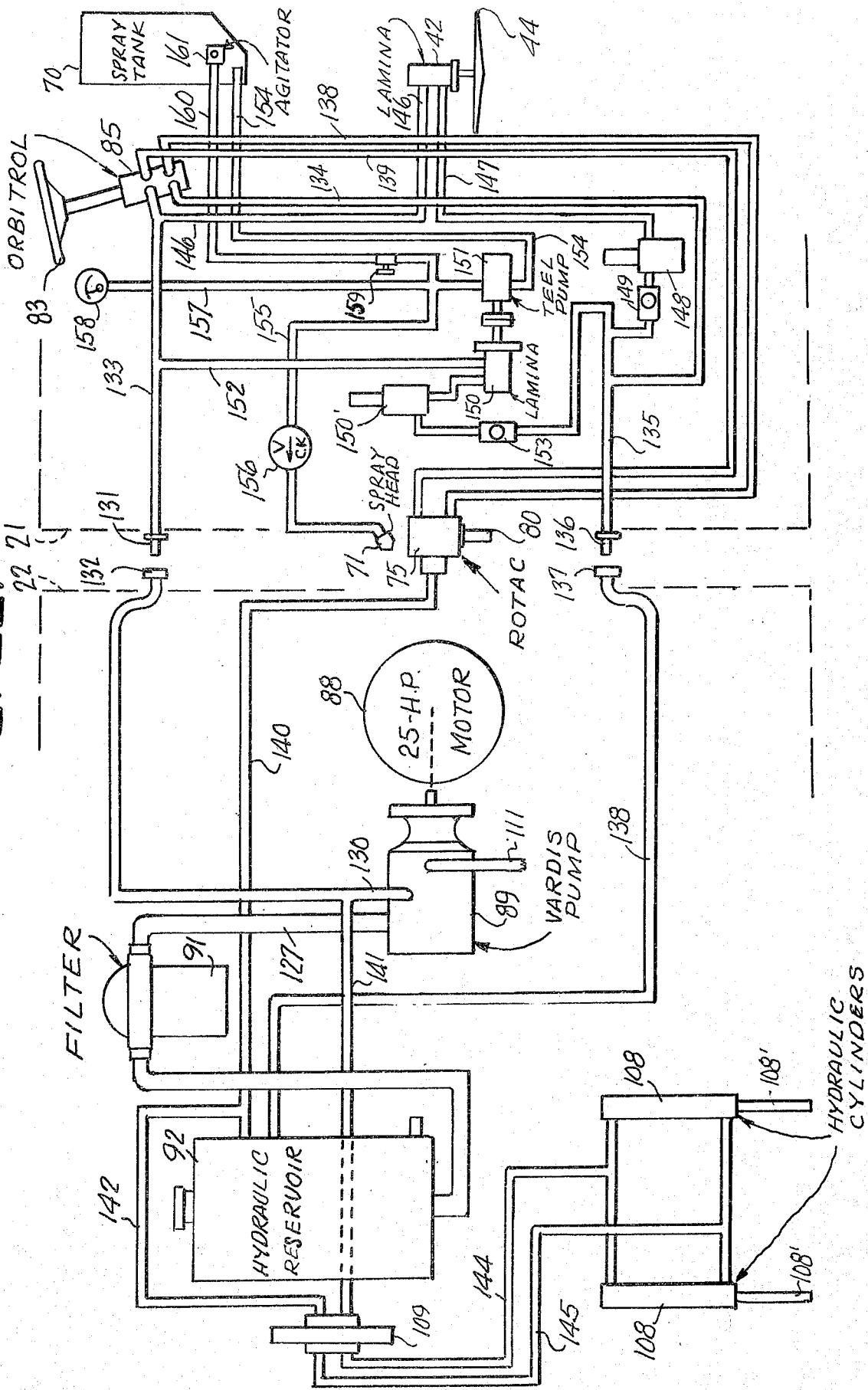
FIG. 12 is a schematic diagram showing the hydraulic circuit associated with the solid material-distributing motor and the liquid material-distributing assembly of the typical lawn treatment machine of FIGS. 1 and 2.

The pump unit 89 also includes a "Vardis" pump section, shown in FIG. 12, which has an outlet conduit 130 connected by detachable interengagable male and female coupling elements 131 and 132, on the front and rear sections 21, 22 respectively, which, in turn, is connected to the intake port of the "Orbitrol" steering valve 85. The outlet conduit 134 of valve 85 connects to a return conduit 135 which is connected by interengagable male and female coupling elements 136, 137 to a return conduit 138 leading to the hydraulic reservoir 92. The outlet ports of the steering reversing valve 85 are connected by conduits 138, 139 to the opposite sides of the "Rotac" steering motor 75. A return conduit 140 is connected between the outlet port of steering motor 75 and hydraulic reservoir 92, as shown in FIG. 12.

Fluid pressure conduit 130 is connected by a conduit 141 to the inlet port of the solenoid reversing valve 109, for operating the scarifier raising and lowering cylinders 108, and the outlet port of solenoid valve 109 is connected by a conduit 142 to return conduit 140. Conduits 144, 145 connect reversing valve 109 to the opposite ends of the scarifier raising and lowering cylinders 108. Reversing valve 109 is controlled by a suitable switch mounted on the instrument panel 110, previously mentioned.

Pressure conduit 133 is connected by a conduit 146 to the inlet port of the "Lamina" hydraulic motor 42 driving the material-distributing disc member 44. The outlet port of hydraulic motor 42 is connected by a conduit 147 through a solenoid-operated control valve 148 and a flow adjusting valve 149 to the return conduit 35. Solenoid valve 148 is controlled by a suitable control switch mounted on instrument panel 110.

As shown in FIG. 12, a "Lamina" hydraulic motor 150 is drivingly connected to a "Teel" pump 151 employed for circulating the chemical liquid material from the spray tank 70. Thus, a conduit 152 connects fluid pressure conduit 133 to the inlet port of the hydraulic motor 150. The outlet port of hydraulic motor 150 is connected through a solenoid valve 150' and an adjustable flow-controlling valve 153 to the return conduit 135. Solenoid valve 150' is controlled by a suitable switch mounted on instrument panel 110.

The inlet port of motor 151 is connected by a conduit 154 to the bottom of spray tank 70, whereby pump 151 develops suction in conduit 154 to draw liquid from the spray tank. The outlet, or positive pressure, port of pump 151 is connected to the spray head nozzle assembly 71 by a conduit 155 including a check valve 156, as shown in FIG. 12. Connected to positive pressure conduit 155 by a conduit 157 is a pressure gauge 158 located in a position to be easily observed by the operator, for example, located on the instrument panel 110. Also connected to the positive pressure conduit 155, through a flow-adjusting valve 159 and a conduit 160, is a pressure-fluid agitator device 161 located in the spray tank 70, the agitator device 161 being substantially of conventional construction.

OPERATION

The machine will be driven at a desired rate of speed by controlling the engine 88 through conventional throttle means operated by a foot pedal 169 provided adjacent the instrument panel 110, as shown in FIG. 1.

The hydraulic transmission 95 is of a conventional type controlled by the foot pedal 169 which provides infinitely variable control for increasing or decreasing the speed of the pump unit 89, reversing direction, and at times stopping the pump unit, in accordance with the position of the control lever 169. Thus, the transmission unit 95 may be of the Sundstrand "18 Series P.V-MF" type.

By moving the foot pedal 169 in one direction, the machine will move forwardly at a speed in accordance with the position of the pedal, and the operator places the pedal in a position to provide a suitable speed for the terrain over which the machine is operating. Steering is accomplished by means of the steering wheel 83 which controls the direction of the hydraulic fluid applied to the "Rotac" steering motor 75. To operate the spreader-applicator elements, solenoid valve 148 is energized by means of its control switch, to thereby drive the spreader motor 42 and solenoid valve 119 is energized by means of its control switch to thereby drive the above-described material-agitating and metering rollers 51 to cause the material from the hopper segments 28 to be delivered downwardly into the casing 36 and to be guided onto the rotating distributor disc member 44. Similarly, the liquid material from the spray tank 70 may be distributed through the nozzle assembly 71 by energizing the solenoid valve 150' by means of its control switch, to thereby activate the "Teel" pump 151. To lower the scarifying blade elements on the rear section 22 of the machine, the solenoid valve 109 is energized by means of its control switch so as to introduce pressure hydraulic fluid into the top portions of the cylinders 108 and allow the hydraulic fluid in the lower portions of said cylinders to flow into the return conduit 142. As above-explained, the scarifying assembly may be elevated by energizing solenoid valve 109 in its reverse direction. The scarifier assembly may be held in any desired position simply by de-energizing the solenoid valve 109 with the assembly in its desired position.

It will be noted that the motor 69, which drives the agitating and metering rollers 51, is connected in series with the wheel motors 48, 48 when the solenoid valve 119 is closed. Thus, with valve 119 in its closed position, the speed of rotation of the agitating and metering rollers 51 is in accordance with the speed of rotation of the driving wheels 47, so that the speed of delivery of the material is increased with an increase in the speed of movement of the machine. Distribution of the material can be stopped by opening the solenoid valve 119 by means of its control switch. The speed range of the machine can be adjusted by adjusting the manually operable bypass valve 126.

From FIG. 2, it will be seen that the distributing disc member 44 is elevated a substantial distance above the ground and has adequate ground clearance, and is also spaced forwardly from the wheels 47 so that there is substantially no interference by the wheels with the distribution of the materials, such as seed, fertilizer or the like, delivered to the rotating disc member 44. It will be further seen that a maximum amount of hopper capacity is provided because the power generating means and associated equipment is mounted on the rear portion 22 of the machine. The material is uniformly distributed by the feeding action of the rollers 51, above-described, which deliver the material from the various hoppers simultaneously to the rotating distributer disc member 44.

It will be seen that by the articulated construction of the machine, a relatively small turn radius is provided, enabling the machine to be easy maneuvered even in relatively restricted locations. Also, it will be seen that by mounting the operator seat 84 rearwardly on the front section in a position sufficiently elevated above the hopper assembly 26, the operator can continuously inspect the hoppers and observe the scattering action as the machine moves across a lawn or other similar area being treated.

While a specific embodiment of an improved lawn treating machine has been disclosed in the foregoing description, it will be understood that various modifications within the spirit of the invention may occur to those skilled in the art. Therefore, it is intended that no limitations by placed on the invention except as defined by the scope of the appended claims.

For completeness and accuracy in disclosing this invention, but without being limited to the specific commercial item listed, the following information is furnished regarding items identified by trademarks herein: (Reference numerals are shown in parenthesis).

"Lamina" Spinner Motor — Model A25F (42) Product of Lamina Bronze Division of Lamina Incorporated P.O. Box 31 Royal Oak, Michigan 48688

"Lamina" Spray System — Model A37F (150) Product of Lamina Bronze, above

"Char-Lynn" Wheel Motors — Model MS03018A03WD (48) Product of Eaton Corporation Fluid Power Division 15151 Highway 5 Eden Prairie, Minnesota 55343

"Char-Lynn" Drive Motor - Model MS03018A021C (69) Product of Eaton Corporation, above "Orbitrol" Steering Unit (85) Product of Eaton Corporation, above "Vardis" Pump — Model VP033-1-A t/f GP (89) Product of Parker Hannifin 17325 Euclid Avenue Cleveland, Ohio "Sundstrand" Transmission — Model 18-2015LH (95) Product of Sundstrand Corporation Airport Road LaSalle, Illinois 61301

"Rotac" Steering Motor — Model RN-32-2X (75) Excello Corporation 945 East Sater Street, Greenville, Ohio 45331

"Waterman" Solenoid Valve — Model 315-6-12 (119) Waterman Hydraulics, Inc. Chicago, Illinois "Teel" Pump — Model 1P734 (151) Dayton Electric Mfg. Co. Chicago, Illinois 60648

The following prior art is known:
U.S. Pat. No. 2,523,014 Gooch Sept. 19, 1950
U.S. Pat. No. 3,265,147 Coordes Aug. 9, 1966
U.S. Pat. No. 3,446,165 Magda et al. May 27, 1969
U.S. Pat. NO. 3,544,013 Dorfman Dec. 1, 1970
U.S. Pat. No. 3,679,334 Keldrauk July 25, 1972

What is claimed is:

1. A lawn treating machine comprising a front body section having a first pair of ground-engaging supporting wheels, a rear body section having a second pair of ground-engaging supporting wheels, means for driving said ground-engaging supporting wheels, power-generating means mounted on said rear body section, vertical hinge means connecting said body sections, a steering motor connected to said hinge means so as to rotate said sections relative to each other to effect steering of the machine, hopper means mounted on said front section and being provided with a depending bottom discharge conduit means, and motor-driven rotating horizontal scattering disc means mounted on said front section spaced forwardly of said first pair of supporting wheels below said discharge conduit means.

2. The lawn treating machine of claim 1, and a ground-scarifying assembly pivoted on a horizontal axis to said rear body section, and means to selectively raise and lower said ground-scarifying assembly.

3. The lawn treating machine of claim 2, and wherein said ground-scarifyng assembly comprises supporting arms pivoted to said rear body section, a transverse shaft supportingly engaged through said arms, a plurality of multi-bladed scarifier blade assemblies rotatably mounted on said shaft for free lateral-swinging motion, and spring means biasing said scarifier blade assemblies toward vertical positions.

4. The lawn treating machine of claim 3, and wherein said raising and lowering means comprises hydraulic cylinder means connecting said supporting arms to said rear body section.

5. The lawn treating machine of claim 3, and wherein said blade assemblies comprise disc members provided on opposite sides with alternate outwardly extending triangular blades, said shaft being provided with spaced spherical bearing members, said disc member being rotatably supportingly engaged on said spherical bearing members, and wherein said spring means comprises coil springs surrounding said shaft and bearing between the disc members and between the arms and the adjacent disc members.

6. The lawn treating machine of claim 1, and wherein said hopper means is spaced forwardly of said first pair of supporting wheels, and downwardly-directed liquid spray nozzle means mounted on the front section rearwardly of the hopper means, a liquid tank mounted on said front section, and conduit means including a pump connected between said liquid tank and said spray nozzle means.

7. The lawn treating machine of claim 6, and wherein said discharge conduit means includes rotatable feed means for feeding solid materials from said hopper means to said scattering disc means simultaneously with the discharge of liquid from said tank through said spray nozzle means.

8. A lawn treating machine comprising a front body section having a first pair of supporting wheels, a rear body section having a second pair of supporting wheels, means for driving said body sections, hinge means connecting said front and rear body sections, steering means operatively connected to said hinge means to effect rotation of said body sections relative to each other, power generating means mounted on said rear body section operatively connected to said driving means, scattering means mounted on said front body section adjacent the forward end thereof and spaced forwardly of said first pair of supporting wheels, hopper means mounted on said front body section and being provided with discharge conduit means, and a ground scarifying assembly mounted on said machine and including substantially vertically oriented means for selectively raising and lowering said assembly into and out of engagement with the ground surface.

9. The lawn treating machine of claim 8, and rotatable feed means in said discharge conduit means, wherein said rotatable feed means comprises a generally cylindrical enclosure in said discharge conduit means having top and bottom openings and a rotatable feed element in said enclosure having metering recesses sequentially exposed to said top and bottom openings to convey metered quantities of material through said discharge conduit means.

10. The lawn treating machine of claim 9, and adjustable cover means, slidably mounted on the discharge conduit means over the enclosure for regulating the admission of material to said top opening.

11. The lawn treating machine of claim 9, and the means to rotate said feed element at a speed in accordance with the speed of said first pair of supporting wheels.

12. The lawn treating machine of claim 9 wherein said driving means comprises traction motor means operatively connected to said first pair of supporting wheels.

13. The lawn treating machine of claim 12 further comprising means to at times operatively connect said power-generating means to said traction motor means and said steering motor means.

14. The lawn treating machine of claim 13, and wherein said traction motor means and said rotatable feed means include hydraulic motor and said power-generating means includes hydraulic pump means, and the means connecting said power-generating means to the traction motor means and the feed means comprises conduit means connecting said pump means in circuit with said hydraulic motors.

15. The lawn treating machine of claim 8, and wherein said hopper means comprises a plurality of compartments communicating with said discharge conduit means for simultaneously distributing materials contained in said compartments.

16. The lawn treating machine in claim 15, and wherein said hopper means is spaced forwardly of said first pair of supporting wheels and said discharge conduit means is provided with respective rotatable feed means communicating with the compartments, and means operatively connecting said power-generating means to said feed means in a manner to drive said feed means at a speed in accordance with the speed of said first pair of supporting wheels.

17. The lawn treating machine of claim 8, and wherein said hopper means is spaced forwardly of said first pair of supporting wheels and said front body section is provided with an operator's seat located behind said hopper means and sufficiently elevated to provide an operator with a clear view over said hopper means.

18. The lawn treating machine of claim 17, and wherein said front body section is provided with means to reversibly control said steering means, located forwardly of said operator's seat.

19. The lawn treating machine of claim 18, and rotatable feed means in said hopper discharge conduit means, means to drive said feed means at a speed in accordance with the speed of said first pair of supporting wheels, and means adjacent the operator's seat to at times deactivate said feed means independently of the operation of said first pair of supporting wheels.

20. The lawn treating machine of claim 8, and wherein said driving means and said steering means comprises respective hydraulic motors and said power generating means includes hydraulic pump means, conduit means connecting said pump means to the driving means, and conduit means including a reversing valve connecting said pump means to the steering hydraulic motor.

21. The lawn treating machine as set forth in claim 8, wherein said, ground scarifying assembly comprises a transversely extending shaft and a plurality of blade assemblies mounted on said shaft for independent rotation about said shaft and independent tilting movement toward and away from each other whereby said blade assemblies will automatically and independently adjust to the contour and nature of the ground surface.

22. The lawn treating machine of claim 21, and wherein said shaft is provided with spaced bearing members, said blade assemblies being rotatably supported on said bearing members, and means biasing said blade assemblies into a substantially parallel relationship with respect to each other.

23. The lawn treating machine of claim 8 and wherein said ground-scarifying assembly comprises supporting arms pivoted to said rear body section, a transverse shaft supportingly engaged through said arms, a plurality of multi-bladed scarifier blade assemblies rotatably mounted on said shaft for free lateral-swinging motion and spring means biasing said scarifier blade assemblies toward vertical positions.

24. The lawn treating machine of claim 23 and wherein said raising and lowering means comprises hydraulic cylinder means connecting said supporting arms to said rear body section.

25. The lawn treating machine of claim 24 and wherein said blade assemblies comprise disc members provided on opposite sides with alternate outwardly extending triangular blades, said shaft being provided with spaced spherical bearing members, said disc members being rotatable supportingly engaged on said spherical bearing members, and wherein said spring means comprises coil springs surrounding said shaft and bearng between the disc members and between the arms and the adjacent disc members.

26. The lawn treating machine of claim 23, and wherein said traction motor means and said rotatable feed means include hydraulic motors and said power generating means includes hydraulic pump means and the means to drive said feed means at a speed in accordance with the speed of the first pair of supporting wheels comprises conduit means connecting said pump means in circuit with said hydraulic motors.

27. The lawn treating machine of claim 8 and wherein said hopper means is spaced forwardly of said first pair of supporting wheels, and downwardly-directed liquid spray nozzle means mounted on the front section rearwardly of the hopper means, a liquid tank mounted on said front section, and conduit means including a pump connected between said liquid tank and said spray nozzle means.

28. The lawn treating machine of claim 27 and wherein said discharge conduit means includes rotatable feed means for feeding solid materials from said hopper means to said scattering disc means simultaneously with the discharge of liquid from said tank through said spray nozzle means.

29. A lawn treating machine which comprises a front body section having a pair of ground-engaging support wheels, a wheeled rear body section, means for driving said body sections, pivot means connecting said front and rear body sections, steering means operatively connected to said front body section and consisting of a single driving member extending therefrom and operatively connected to said rear body section to effect relative rotation between said front and rear body sections about said pivot means, power generating means on said rear body section, hopper means mounted on said front body section and being provided with discharge conduit means, and an operator's seat mounted on said front body section located behind said hopper means and sufficiently elevated to provide an operator seated therein a substantially clear view over said hopper means whereby the contents distribution thereof may be visually monitored by said operator.

30. The lawn treating machine of claim 29, and rotatable feed means in said discharge conduit means, wherein said rotatable feed means comprises a generally cylindrical enclosure in said discharge conduit means having top and bottom openings and a rotatable feed element in said enclosure having metering recesses sequentially exposed to said top and bottom openings to convey metered quantities of material through said discharge conduit means.

31. The lawn treating machine of claim 30, and adjustable cover means, slidably mounted on the discharge conduit means over the enclosure for regulating the admission of material to said top opening.

32. The lawn treating machine of claim 30, and the means to rotate said feed element at a speed in accordance with the speed of said first pair of supporting wheels.

33. The lawn treating machine of claim 29, and wherein said hopper means comprises a plurality of compartments communicating with said discharge conduit means for simultaneously distributing materials contained in said compartments.

34. The lawn treating machine of claim 29, and a ground-scarifying assembly pivoted on a horizontal axis to said rear body section, and means to selectively raise and lower said ground-scarifying assembly.

35. The lawn treating machine as set forth in claim 34, wherein said ground scarifying assembly comprises a transversely extending shaft and a plurality of blade assemblies mounted on said shaft for independent rotation about said shaft and independent tilting movement toward and away from each other whereby said blade assemblies will automatically and independently adjust to the contour and nature of the ground surface.

36. The lawn treating machine of claim 35, and wherein said shaft is provided with spaced bearing members, said blade assemblies being rotatably supported on said bearing members, and means biasing said blade assemblies into a substantially parallel relationship with respect to each other.

37. The lawn treating machine of claim 36, and wherein said raising and lowering means comprises hydraulic cylinder means connecting said supporting arms to said rear body section.

38. The lawn treating machine of claim 29, and rotatable feed means in said hopper discharge conduit means, means to drive said feed means at a speed in accordance with the speed of said first pair of supporting wheels, and means adjacent the operator's seat to at times deactivate said feed means independently of the operation of said first pair of supporting wheels.

* * * * *